(12) United States Patent
Yoshida et al.

(10) Patent No.: US 10,717,219 B2
(45) Date of Patent: Jul. 21, 2020

(54) MOLDING METHOD AND MOLDING DIE FOR MOLDED ARTICLE

(71) Applicant: NOK CORPORATION, Tokyo (JP)

(72) Inventors: Bunpei Yoshida, Kanagawa (JP);
Takeshi Masaka, Shizuoka (JP);
Shigeru Watanabe, Kanagawa (JP);
Shun Murasaki, Shizuoka (JP)

(73) Assignee: NOK CORPORATION (JP)

( * ) Notice: Subject to any disclaimer, the term of this patent is extended or adjusted under 35 U.S.C. 154(b) by 307 days.

(21) Appl. No.: 15/522,639

(22) PCT Filed: Sep. 17, 2015

(86) PCT No.: PCT/JP2015/076395
§ 371 (c)(1),
(2) Date: Apr. 27, 2017

(87) PCT Pub. No.: WO2016/067784
PCT Pub. Date: May 6, 2016

(65) Prior Publication Data
US 2017/0312963 A1  Nov. 2, 2017

(30) Foreign Application Priority Data
Oct. 31, 2014 (JP) .................................. 2014-222765

(51) Int. Cl.
*B29C 45/34* (2006.01)
*B29C 45/14* (2006.01)
(Continued)

(52) U.S. Cl.
CPC .......... *B29C 45/34* (2013.01); *B29C 45/0025* (2013.01); *B29C 45/14754* (2013.01);
(Continued)

(58) Field of Classification Search
CPC ......... B29C 45/38; B29C 45/34; B29C 45/12; B29C 45/1759; B29C 45/27
(Continued)

(56) References Cited

U.S. PATENT DOCUMENTS 5,679,304 A * 10/1997 Watanabe ............... B29C 45/14
264/242
2010/0258975 A1* 10/2010 Goda ................... B29C 45/2602
264/272.21
(Continued)

FOREIGN PATENT DOCUMENTS

CN     1444518 A     9/2003
CN     102729393 A   10/2012
(Continued)

OTHER PUBLICATIONS

"Basics of Injection Molding" https://www.3dsystems.com/quickparts/learning-center/injection-molding-basics, accessed Mar. 28, 2019 (Year: 2014).*
(Continued)

*Primary Examiner* — Peter L Vajda
*Assistant Examiner* — Caroline Montiel
(74) *Attorney, Agent, or Firm* — Harness, Dickey & Pierce, P.L.C.

(57) ABSTRACT

The purpose of the present invention is to make it possible to shorten the time required for a burr removal step and make it difficult for the burrs to detach from a sheet member in a step for removing the burrs together with the sheet member. For removal, by making the burrs to adhere to a pliable sheet member such as paper or nonwoven fabric that has been incorporated beforehand in the molding die and stripping the sheet member from the molding die, the burrs are removed together with the sheet member. The present invention is characterized in that in order to make it difficult
(Continued)

for the burrs to detach from the sheet member during the stripping, a radiused shape with an arc-shaped cross-section is formed by the molding die on the areas surrounding the sections where the burrs adhere to the sheet member.

4 Claims, 10 Drawing Sheets

(51) Int. Cl.
*B29C 45/38* (2006.01)
*B29C 45/00* (2006.01)
*B29C 45/17* (2006.01)
*B29K 21/00* (2006.01)
*B29L 31/26* (2006.01)

(52) U.S. Cl.
CPC .......... *B29C 45/1759* (2013.01); *B29C 45/38* (2013.01); *B29C 2045/0036* (2013.01); *B29C 2045/1477* (2013.01); *B29K 2021/006* (2013.01); *B29L 2031/265* (2013.01)

(58) Field of Classification Search
USPC .... 264/161, 536, 266, 328.9, 500, 251, 273, 264/274, 275, 328.12; 425/441, 569, 572, 425/573, 546, 557
See application file for complete search history.

(56) References Cited

U.S. PATENT DOCUMENTS

| | | | |
|---|---|---|---|
| 2011/0127692 A1 | | 6/2011 | Watanabe |
| 2012/0018927 A1 | * | 1/2012 | Watanabe ........... B29C 45/2669 |
| | | | 264/500 |

FOREIGN PATENT DOCUMENTS

| | | | | |
|---|---|---|---|---|
| JP | H05-4250 A | | 1/1993 | |
| JP | 11254486 A | * | 9/1999 | ......... B29C 45/2756 |
| JP | 3047304 B2 | | 5/2000 | |
| JP | 2002-283401 A | | 10/2002 | |
| JP | 2002-292684 A | | 10/2002 | |
| JP | 2002283401 A | * | 10/2002 | |
| JP | 2008-168448 A | | 7/2008 | |
| JP | 4993077 B2 | | 8/2012 | |
| WO | WO-2009-142082 A1 | | 11/2009 | |

OTHER PUBLICATIONS

"Basics of Injection Molding" https://www.3dsystems.com/quickparts/learning-center/injection-molding-basics, accessed Mar. 28, 2019 (Year: 2014) (Year: 2014).*

Guidelines for Plastic Product Designer, edited by Zhiyu Tang and Peixian Xu, National Defense Industry Press, Beijing, China, Sep. 1993, see p. 175.

Second Office Action for Patent Application No. Cn 201580053676. X, dated Apr. 9, 2019 (10 pages).

* cited by examiner

-PRIOR ART-

MOLDING METHOD AND MOLDING DIE FOR MOLDED ARTICLE

CROSS-REFERENCE TO RELATED APPLICATIONS

This application is a U.S. National Stage Application of International Application No. PCT/JP2015/076395, filed on Sep. 17, 2015, and published in Japanese as WO 2016/067784 A1 on May 6, 2016 and claims priority to Japanese Application No. 2014-222765, filed on Oct. 31, 2014. The entire disclosures of the above applications are incorporated herein by reference.

BACKGROUND OF THE INVENTION

Field of the Invention

The present invention relates to a molding method and a molding die for molding a molded article such as a gasket related to a sealing technique. For example, the molding method and the molding die of the present invention are used in the field of rubber molding requiring a multipoint injection gate, and are additionally used in a molding method including a plurality of different runner burr processing steps.

Description of the Conventional Art

Figure 6:
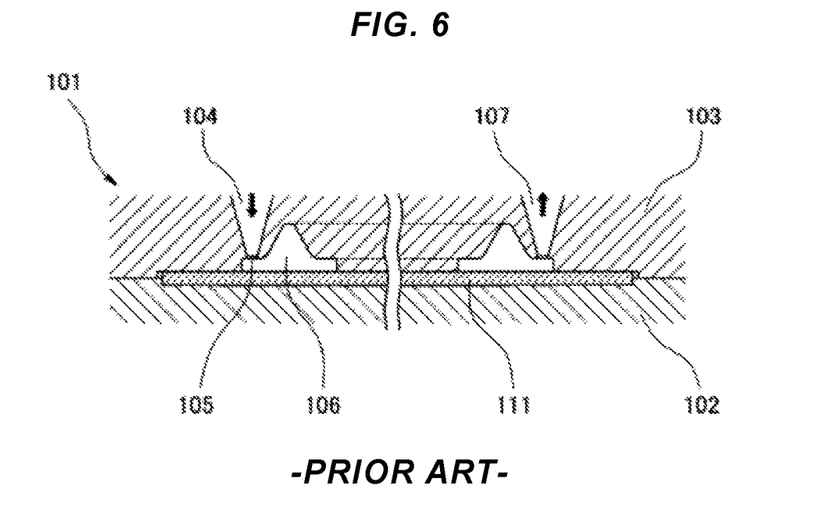
FIG. 6 is a cross-sectional view of a molding die according to a conventional example.

The present applicants previously proposed an invention related to a method for manufacturing a seal part (see Japanese Patent No. 4993077B) by integrally molding a film-like, sheet-like, or plate-like substrate 111 and a gasket formed from a rubber-like elastic material (not illustrated) as illustrated in FIG. 6. This method includes setting and clamping the substrate 111 between split molds 102 and 103 of a molding die 101; and filling a cavity 106 defined between the surface of the substrate 111 and the opposing inner surface of the split mold 103 with a molding rubber material (not illustrated) via a gate 105, while evacuating from the cavity 106 via an air vent hole 107 opened at the confluent position of the molding rubber material in the cavity 106 so as to be spaced apart from the abutment surface of the split mold 103 with the substrate 111. In this conventional art, runner burrs (not illustrated) formed in runners 104 and vent burrs (not illustrated) formed in the air vent holes 107 after molding must be removed one at a time. Therefore, this step of removing the burrs one at a time requires a long time and, particularly, in molding with a large number of burrs, the removal step may become a major obstacle to cycle time shortening.

As such, research has been conducted into a solution aimed at cycle shortening. In this research, so-called paper releasing, which has been successfully employed for nozzle touch portions and the like in transfer molding, is applied in a step for collectively removing the runner burrs and the vent burrs.

Figure 7A:
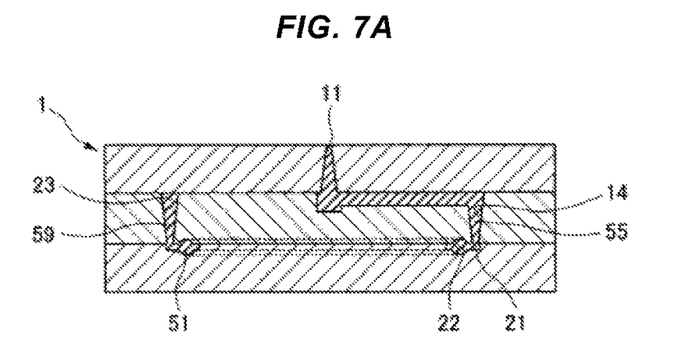
FIGS. 7A, 7B, and 7C are cross-sectional views and operation explanatory views of a molding die according to a comparative example.
Figure 7B:
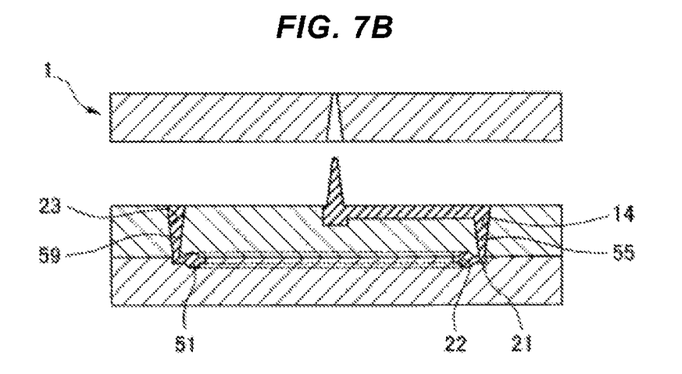
Figure 7C:
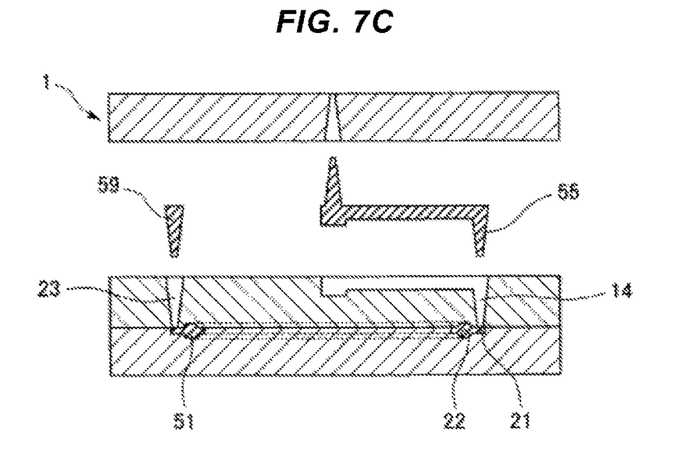
Figure 8A:
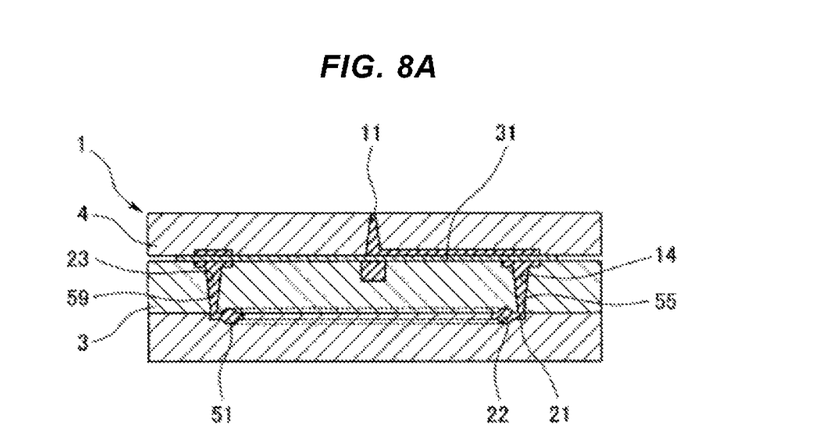
FIG. 8A is a cross-sectional view of the molding die according to the comparative example.
Figure 8B:
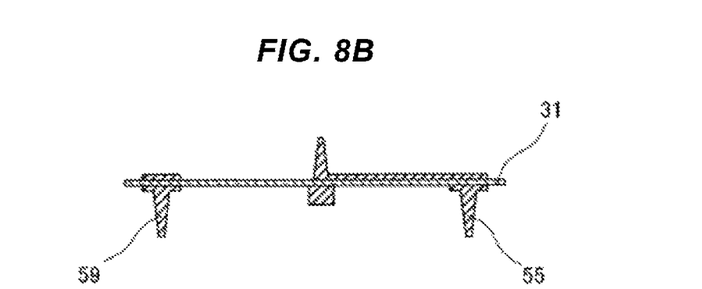
FIG. 8B is a cross-sectional view of an integrated article of a paper and a burr removed from the molding die.

Here, as illustrated in FIGS. 7A and 7B, which are given as a comparative reference example to the present invention, a molded article 51 is molded by a molding die 1 including a sprue 11, a runner 14, a gate 21, a cavity 22, and an air vent 23 in series, and the mold is opened. Thereafter, as illustrated in FIG. 7C, the runner burr 55 formed in the runner 14 and the air vent burr 59 formed in the air vent hole 23 are removed one at a time and, as such, time is required. Thus, as illustrated in FIG. 8A, with a pliable sheet member 31 such as paper or nonwoven fabric placed beforehand between the split molds 3 and 4, the injecting and molding of the molding material in this state is performed, resulting in the burrs 55 and 59 being caused to adhere to the sheet member 31. After the mold is opened, peeling the sheet member 31 from the split mold 3 causes the burrs 55 and 59 to be removed together with the sheet member 31. This removal method is what is known as paper releasing. As a result of this paper releasing, as illustrated in FIG. 8B, a plurality of burrs 55 and 59 can be collectively removed using one sheet of the sheet member 31 and, thus, the time required for the burr removal step can be shortened.

However, adhesion of the burrs 55 and 59 to the sheet member 31 is a force obtained by the impregnation of the sheet member 31 with the molding rubber material that becomes the burrs 55 and 59. Therefore, while adhesion will tend to be stronger with respect to the member with a lower porosity, namely the sheet member 31, there is a problem in that the strength of the sheet member 31 itself declines in cases where porosity is low, and releasability becomes unstable in that tearing and the like of the sheet member 31 may occur. Additionally, the degree of freedom of selection of the sheet member 31 is limited because the quality, such as paper quality, of the sheet member 31 has a large influence. Consequently, there are problems of increased costs of the sheet member 31 and the like.

Figure 9A:
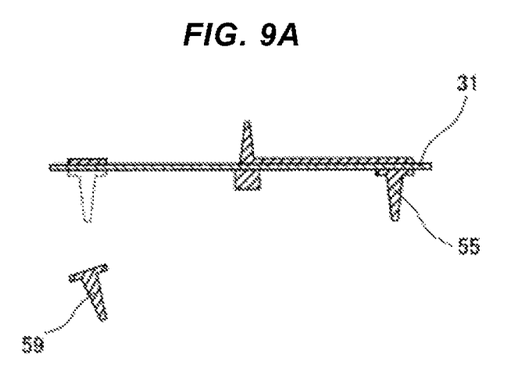
FIGS. 9A and 9B are explanatory drawings illustrating states in which failures have occurred in the same integrated article.
Figure 9B:
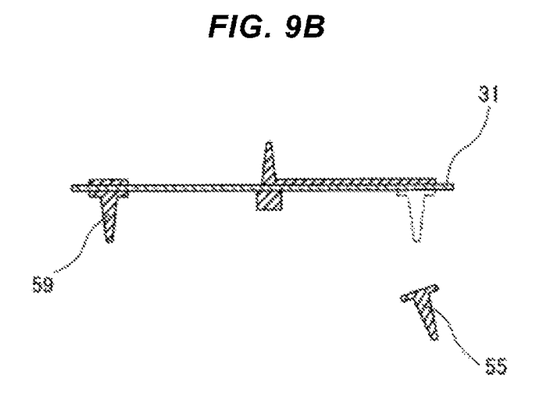

On the other hand, in the paper releasing, it is thought that filling both sides in the thickness direction of the sheet member 31 with the molding rubber material increases the integration strength of the burrs 55 and 59 with the sheet member 31. However, even so, the bonding strength is insufficient and, as illustrated in FIGS. 9A and 9B, at the time of releasing, the burrs 55 and 59 detach from the sheet member 31 at a boundary face thereof. As a result, a problem occurs in that collective removal cannot be performed. Additionally, because the molding rubber material is disposed on both sides of the sheet member 31, the number of times that the rubber material breaks through the sheet member 31 when the rubber material is injected at the start of molding is increased. Consequently, there is a concern regarding increased risks of the fiber of the sheet member 31 being mixed in the molded article as a contaminant.

SUMMARY OF THE INVENTION

Problem to be Solved by the Invention

In light of the foregoing, an object of the present invention is to provide a molding method and a molding die for a molded article designed to allow the time required for a burr removal step to be shortened, and make the burrs less prone to detach from the sheet member in a step for removing the burrs together with a sheet member.

Means for Solving the Problem

In order to achieve the object described above, a molding method for a molded article according to the first aspect of the present invention includes: molding a molded article with a molding die including a sprue, a runner, a gate, and a cavity in series; opening the molding die; and, thereafter removing a burr formed in the runner from the molding die. In the removing, with burr adhering to a pliable sheet member such as paper or nonwoven fabric placed beforehand in the molding die, peeling the sheet member from the molding die causes the burr to be removed together with the sheet member. A radiused shape with an arcuate cross section is given by the molding die to a periphery of an adhering portion, to the sheet member, of the burr so as to make the burr less prone to detach from the sheet member in the peeling.

Additionally, the molding method for a molded article according to the second aspect of the present invention is based on the molding method of the first aspect of the present invention described above. In such a method, the molding die includes an air vent hole communicating with the cavity, and the molding method includes removing a burr formed in the air vent hole from the molding die together with the burr formed in the runner.

Additionally, the molding method for a molded article according to the third aspect of the present invention is based on the molding method of the first or second aspect of the present invention. In such a method, in addition to the radiused shape with an arcuate cross section being given by the molding die to the periphery of the adhering portion, to the sheet member, of the burr, a thin film-like adhered portion integral with the burr is molded by the molding die on an outer side of the radiused shape.

A molding die according to the fourth aspect of the present invention includes: a first split mold; a second split mold configured to be combined with the first split mold in an openable and closeable manner; and a third split mold configured to be combined with the second split mold in an openable and closeable manner. In such a molding die, a gate and a cavity are provided in a parting portion between the first split mold and the second split mold; a sprue is provided in the third split mold; a sprue-side runner leading from the sprue is provided on a surface of the third split mold adjacent to the second split mold or on a surface of the second split mold adjacent to the third split mold; a gate-side runner leading from the sprue-side runner to the gate is provided on the second split mold; a structure in which a burr formed in the sprue-side runner and a burr formed in the gate-side runner adhere to a pliable sheet member such as paper or nonwoven fabric placed between the second split mold and the third split mold is provided; and a radiused shape shaping portion configured to give a radiused shape with an arcuate cross section to the burr formed in the gate-side runner is provided on an opening periphery portion of the gate-side runner adjacent to the sheet member.

Additionally, a molding die according to the fifth aspect of the present invention is based on the molding die of the fourth aspect of the present invention. In such a molding die, the second split mold includes: an air vent hole leading from the cavity; a structure in which a burr formed in the air vent hole adheres to the sheet member is provided; and a radiused shape shaping portion configured to give a radiused shape with an arcuate cross section to the burr formed in the air vent hole is provided on an opening periphery portion of the air vent hole adjacent to the sheet member.

Furthermore, a molding die according to the sixth aspect of the present invention is based on the molding die according to the fourth or fifth aspect of the present invention. In such a molding die, a thin film molding portion configured to mold a thin film-like adhered portion integral with the burr is provided on an outer side of the radiused shape shaping portion.

Note that the molding method for a molded article according to the second aspect described above is recited as being dependent on the first aspect, but can also be recited in independent form as follows. A molding method for a molded article including: molding a molded article in a molding die including a sprue, a runner, a gate, a cavity, and an air vent in series; opening the molding die; and thereafter removing a burr formed in the runner and a burr formed in the air vent hole from the molding die. In the removing, with the burrs adhering to a pliable sheet member such as paper or nonwoven fabric placed beforehand in the molding die, peeling the sheet member from the molding die causes the burrs to be removed together with the sheet member; and a radiused shape with an arcuate cross section is given by the molding die to a periphery of an adhering portion, to the sheet member, of the burrs so as to make the burrs less prone to detach from the sheet member in the peeling.

As described above, the molding method for a molded article according to the first aspect of the present invention involves the removal of the burr formed in the runner, while the molding method for a molded article according to the second aspect of the present invention involves the removal of the burr formed in the runner and the burr formed in the air vent hole.

The molding die according to the fifth aspect of the present invention is recited as being dependent on the fourth aspect of the present invention, but can also be recited in independent form as follows. A molding die including: a first split mold; a second split mold configured to be combined with the first split mold in an openable and closeable manner; and a third split mold configured to be combined with the second split mold in an openable and closeable manner; wherein a gate and a cavity are provided in a parting portion between the first split mold and the second split mold; a sprue is provided in the third split mold; a sprue-side runner leading from the sprue is provided on a surface of the third split mold adjacent to the second split mold or on a surface of the second split mold adjacent to the third split mold; a gate-side runner leading from the sprue-side runner to the gate is provided on the second split mold; an air vent hole leading from the cavity is provided on the second split mold; a structure in which a burr formed in the sprue-side runner, a burr formed in the gate-side runner, and a burr formed in the air vent hole adhere to a pliable sheet member such as paper or nonwoven fabric placed between the second split mold and the third split mold is provided; a radiused shape shaping portion configured to give a radiused shape with an arcuate cross section to the burr formed in the gate-side runner is provided on an opening periphery portion of the gate-side runner adjacent to on the sheet member; and a radiused shape shaping portion configured to give a radiused shape with an arcuate cross section to the burr formed in the air vent hole is provided on an opening periphery portion of the air gate hole adjacent to the sheet member.

As described above, the molding die according to the fourth aspect of the present invention involves removing the burr formed in the sprue-side runner and the burr formed in the gate-side runner, while the molding die according to the fifth aspect of the present invention involves removing the burr formed in the sprue-side runner, the burr formed in the gate-side runner, and the burr formed in the air vent hole.

Figure 10:
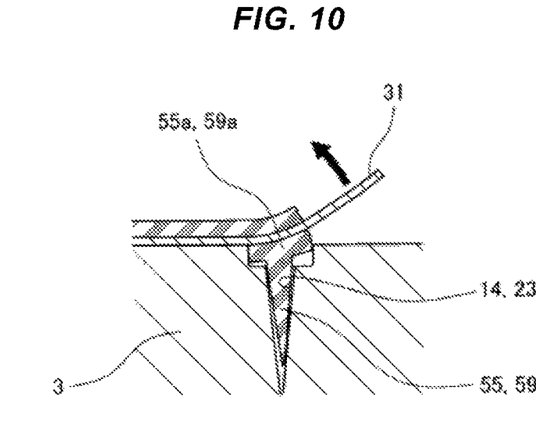
FIG. 10 is an explanatory drawing illustrating a burr removal step of the molding die.

It is thought that the fact that the burrs 55 and 59 easily detach from the sheet member 31 in the comparative reference example illustrated in FIGS. 8A and 8B results from stress concentrated in the adhering portions 55*a* and 59*a*, to the sheet member 31, of the burrs 55 and 59 when the sheet member 31 is peeled starting from the edge thereof for peeling the sheet member 31 from the split mold 3 as illustrated in FIG. 10. In contrast, in the present invention, the radiused shape with an arcuate cross section is provided on the periphery of the adhering portion, to the sheet member, of the burr, which makes stress less prone to concentrate due to the presence of the radiused shape. Accordingly, the adhesive force of the burr to the sheet member can be increased and the burr will not easily detach from the sheet member. Additionally, due to the fact that the thin film-like adhered portion integral with the burr is molded on the outer side of the radiused shape, this thin film-like adhered portion also adheres to the sheet member, allowing the adhesive force of the burr to the sheet member to be further increased.

In the molding die according to the present invention, a radiused shape shaping portion is provided on the opening periphery portion of the gate-side runner adjacent to the paper and on the opening periphery portion of the air vent hole adjacent to the paper in order to give the radiused shape with an arcuate cross section described above to the burr. In order to mold the thin film-like adhered portion on the burr, the thin film molding portion is additionally provided on the outer side of the radiused shape shaping portion. Typically, a plurality of burrs (a plurality of runner burrs, or a plurality of runner burrs and vent burrs) are collectively removed from the molding die by the sheet member.

Effect of the Invention

The present invention provides the following advantageous effects.

Specifically, in the present invention, as described above, so-called paper releasing is performed. As such, the time required for the burr removal step can be shortened. Moreover, the radiused shape with an arcuate cross section is provided on the periphery of the adhering portion, to the sheet member such as paper, of the burr, and as such, stress does not easily concentrate due to this radiused shape. Accordingly, the adhesive force of the burr to the sheet member can be increased and the burr will not easily detach from the sheet member. Additionally, this configuration in which the thin film-like adhered portion integral with the burr is molded on the outer side of the radiused shape causes this thin film-like adhered portion to adhere to the sheet member, allowing the adhesive force of the burr to the sheet member to be further increased.

DETAILED DESCRIPTION OF PREFERRED EMBODIMENTS

The present invention includes the following embodiments.

(1) In order to solve the problem of a rubber (burr) detaching from a paper at a boundary portion therebetween, a root portion is radiused so as to reduce the action of mold release resistance of the rubber at the boundary face.

(2) The root portion is radiused with the structure in which the paper is sandwiched from top and bottom by rubber maintained so that stress does not concentrate at the boundary portion between the paper and the rubber.

(3) The root portion is radiused while doing away with the structure in which the paper is sandwiched from top and bottom by the rubber.

(4) As a result of being radiused in order to avoid the concentration of mold release resistance at the boundary portion between the paper and the rubber, the integrity of the paper with the rubber is enhanced. Particularly, in paper releasing, the entire paper is not peeled at the same time. Rather, the paper is peeled from one side. As such, peeling is performed while a moment acts on the paper and the rubber. Thus, it is difficult to obtain advantageous effects with respect to integrated mold releasability even if the contact area between the paper and the rubber is increased, and it is important that the forces acting at the boundary between the paper and the rubber at the first location lifted up be reduced. Being radiused causes the forces acting on the boundary portion to be dispersed, which makes it possible to prevent the rubber from detaching at a time of paper releasing. Note that the direction of releasing varies in a manner that depends on products and, as such, a shape where the entire periphery is radiused is more stable.

(5) The entire periphery of the root is radiused with the top/bottom rubber sandwiched structure maintained. Note that as the integrating force when releasing increases due to addition of the radiused root, integrated releasing can be performed without the top/bottom rubber sandwiched structure. Additionally, due to the fact that a thin film of rubber is added at the tip of the radiused root, the integrating force with the paper can be further increased and greater stability has been confirmed.

(6) Without the top/bottom rubber sandwiched structure, paper releasing is possible via simple flow paths without the need for utilizing a complex material flow path structure (flow path structure in which a material flows on the top and bottom of the paper). Additionally, reducing the number of times the rubber breaks through the paper and flows from three times to one time can minimize the risk of the fibers of the paper being mixed in the material, which is possible when the rubber breaks through the paper.

(7) Examples of articles that may be molded by the molding method and the molding die of the present invention include gaskets for fuel cells such as CELLSEAL for fuel cell. Typically, gaskets for fuel cells are obtained by integrally molding (insert molding) a rubber-like elastic gasket with a base material plate such as separator and the like. However, the molding method and the molding die of the present invention may be a molding method and a molding die for insert molding in which the insert part is inserted into the molding die in molding.

(8) Nonwoven fabric may be used instead of the paper. In the present invention, a pliable sheet member such as paper or nonwoven fabric is used.

(9) The present invention is used for collectively removing a plurality of runner burrs, or is used for collectively removing a plurality of runner burrs and vent burrs.

EXAMPLES

Next, examples of the present invention are described with reference to the drawings.

First Example

Figure 1A:
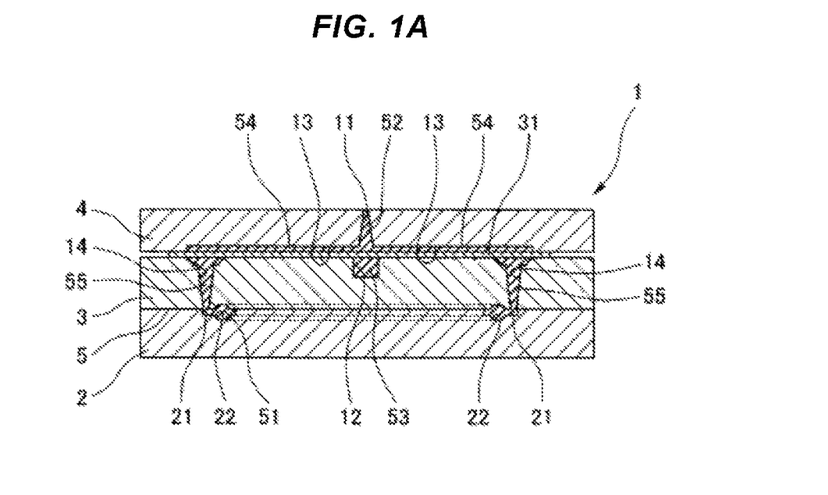
FIG. 1A is a cross-sectional view of a molding die according to a first example of the present invention.

FIG. 1A illustrates a molding die 1 according to the first example of the present invention. The molding die 1 is configured to mold (injection mold) a sealing article 51, such as a gasket, formed from a rubber-like elastic material, as the molded article thereof. The molding die 1 is provided with a first split mold 2, a second split mold 3 combined with the first split mold 2 in an openable and closeable manner, and a third split mold 4 combined with the second split mold 3 in an openable and closeable manner. The first split mold (bottom mold) 2, the second split mold (middle mold) 3, and the third split mold (top mold) 4 are arranged in order from bottom to top in FIG. 1A.

A gate 21 and cavity 22 are provided in a parting portion 5 between the first split mold 2 and the second split mold 3. The cavity 22 is formed in an endless shape in order to correspond to a sealing article, such as a gasket, which typically has an endless shape. The gate 21 is provided at a plurality of locations (two locations in FIG. 1A) on periphery of the cavity 22.

A sprue 11 is provided, in the third split mold 4, penetrating through the third split mold 4 in a plate thickness direction. Sprue-side runners 13 leading from an end portion of the sprue 11 are radially provided, in a groove shape, on the surface of the third split mold 4 adjacent to the second split mold. Gate-side runners 14, each leading from an end portion of each of the sprue-side runners 13 to each of the gates 21, are provided, in a hole shape, penetrating through the second split mold 3 in the plate thickness direction. Additionally, a sprue reservoir 12 is provided on the surface of the second split mold 3 adjacent to the third split mold, at a position on the plane corresponding to the sprue 11.

A structure is given in which a pliable sheet member such as paper or nonwoven fabric (hereinafter also referred to as "paper") 31 is sandwiched between the second split mold 3 and the third split mold 4. The sandwiched sheet member 31 is clamped by both surfaces of the second split mold 3 adjacent to the third split mold and of the third split mold 4 adjacent to the second split mold and faces the sprue 11, the sprue reservoir 12, the sprue-side runners 13 and the gate-side runners 14. Therefore, the rubber-like molding material charged into each of these portions is brought into contact with the sheet member 31 and is partially impregnated into the sheet member 31. Then, after curing, this rubber-like molding material adheres to the sheet member 31 as burrs (a sprue burr 52 formed in the sprue 11, a sprue burr 53 formed in the sprue reservoir 12, runner burrs 54 formed in the sprue-side runners 13, and runner burrs 55 formed in the gate-side runners 14).

Note that the rubber-like molding material, when being injected, penetrates through the sheet member 31 in the thickness direction or breaks through a portion of the sheet member 31, thereby flowing from the sprue 11 to the sprue reservoir 12, and from the sprue-side runners 13 to the gate-side runners 14.

Figure 1B:
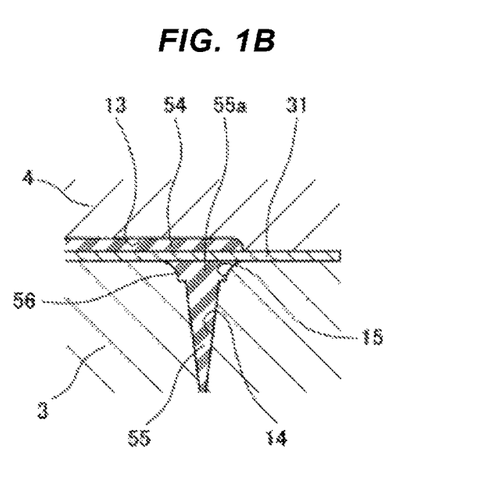
FIGS. 1B and 1C are each enlarged views of the main constituents of FIG. 1A.
Figure 1C:
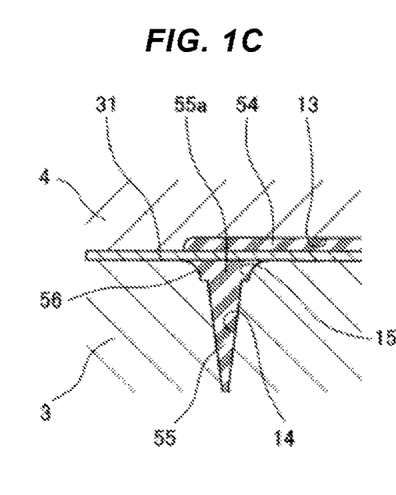

The hole-shaped gate-side runners 14 are formed in a funnel shape so that an opening cross-sectional area thereof gradually shrinks from the side adjacent to the sheet member 31 to the side adjacent to the gate 21. However, end portions of the gate-side runners 14 adjacent to the sheet member 31 are formed as disk-shaped spaces with comparatively large diameters in order to secure a wide adhering area of portions (root portions) of the runner burrs 55 that are formed at the end portions of the gate-side runners 14 adjacent to the sheet member 31 and are defined as adhering portions 55a to the sheet member 31. However, if the inner peripheral surfaces of these disk-shaped spaces are left perpendicular to the plane of the sheet member 31, stress will easily concentrate in the burr removal step as described above, and the burrs 55 will easily detach from the sheet member 31. As such, in this example, as enlarged and illustrated in FIGS. 1B and 1C, a configuration is given in which a radiused shape 56 with an arcuate cross section is given to the periphery of each of the adhering portions 55a, to the sheet member 31, of the runner burrs 55. As such, in order to give the radiused shape 56 with an arcuate cross section to the runner burrs 55 formed in the gate-side runners 14, a radiused shape shaping portion 15 is provided on an opening periphery portion of the gate-side runners 14 adjacent to the sheet member 31. The radiused shape 56 is a concave radiused shape, the radiused shape shaping portion 15 is a convex radiused shape, and these are provided over the entire periphery.

Molding with the molding die 1 described above, as a molding method, includes molding a molded article 51 with the molding die 1 that includes the sprue 11, the sprue reservoir 12, the sprue-side runners 13, the gate-side runners 14, the gates 21, and the cavities 22; opening the molding die 1; and thereafter, performing a burr removal step for removing the burrs 52, 53, 54, and 55, including the plurality of runner burrs 55 formed in the plurality of gate-side runners 14, from the molding die 1. In the burr removal step, with the burrs 52, 53, 54, and 55 adhering to the sheet member 31 placed beforehand in the molding die 1, peeling the sheet member 31 from the split mold 3 of the molding die 1 causes the burrs 52, 53, 54, and 55 to be removed together with the sheet member 31. Additionally, the radiused shape 56 with an arcuate cross section is given by the molding die 1 to the peripheries of the adhering portions 55a, to the sheet member 31, of the runner burrs 55 so as to make the runner burrs 55 less prone to detach from the sheet member 31 in the peeling as described above.

Thus, according to this example, so-called paper releasing is performed. As such, the time required for the burr removal step can be shortened. Moreover, the radiused shape 56 with an arcuate cross section is provided on the periphery of each of the adhering portions 55a, to the sheet member 31, of the runner burrs 55, which makes stress less prone to concentrate due to this radiused shape 56 and makes the runner burrs 55 less prone to detach from the sheet member 31.

Figure 2A:
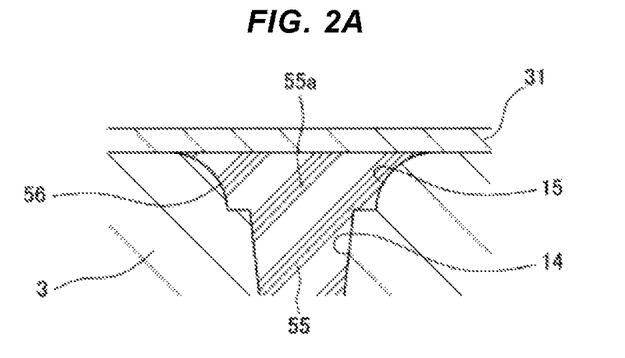
FIGS. 2A, 2B, and 2C are cross-sectional views of the main constituents of the same molding die.
Figure 2B:
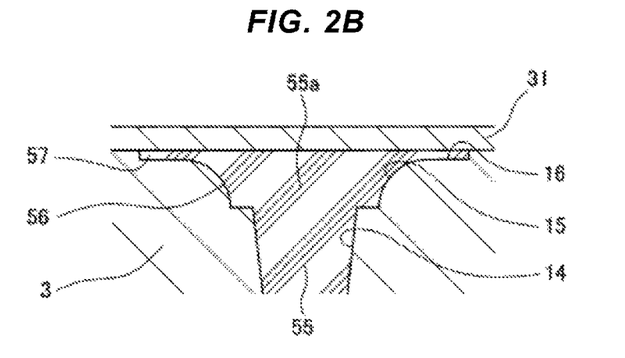
Figure 2C:
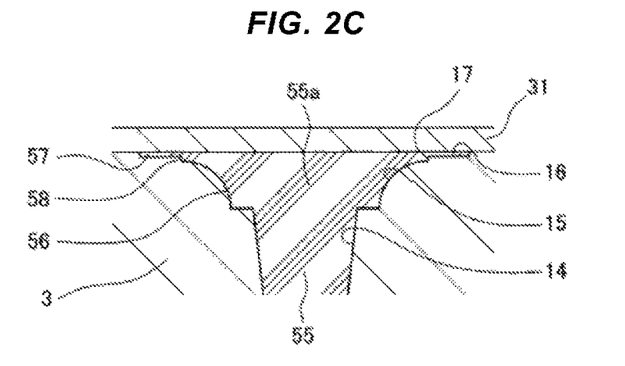

Note that, in this example, as further enlarged and illustrated in FIG. 2A, the annular radiused shape 56 with an arcuate cross section is provided on the periphery of the adhering portion 55a at the root of the burr 55, in an angle range of substantially 90 degrees. Additionally, as illustrated in FIGS. 2B and 2C, a thin film-like adhered portion 57 integral with the burr 55 may be provided on the outer side (on the outer periphery side) of the radiused shape 56. The thin film-like adhered portion 57 adheres to the sheet member 31 as a portion of the burr 55, and is molded into an annular shape as a portion of the burr 55 by a thin film molding portion 16 provided on the outer side of the radiused shape shaping portion 15 of the molding die 1. Such a configuration in which the thin film-like adhered portion 57 integral with the burr 55 is molded on the outer side of the radiused shape 56 causes this thin film-like adhered portion 57 to adhere to the sheet member 31, allowing the adhesive force of the burr 55 to the sheet member 31 to be further increased. In the example illustrated in FIG. 2C, a step portion 58 is provided between the radiused shape 56 and the thin film-like adhered portion 57 in order to reduce the thickness of the thin film-like adhered portion 57, and a step molding portion 17 is provided between the radiused shape shaping portion 15 and the thin film molding portion 16.

Second Example

Figure 3A:
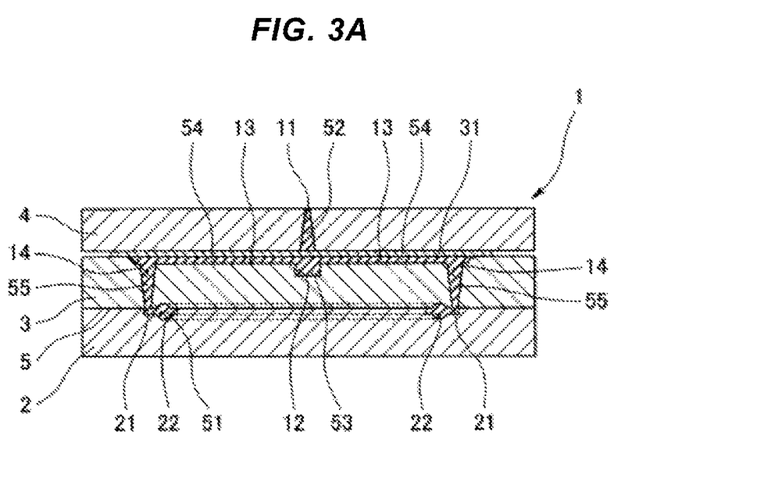
FIG. 3A is a cross-sectional view of a molding die according to a second example of the present invention.

In the first example described above, the sprue-side runners 13, each leading from the end portion of the sprue 11, are radially provided, in a groove shape, on the surface of the third split mold 4 adjacent to the second split mold. Alternatively, the sprue-side runners 13, each leading from the end portion of the sprue 11, may be radially provided, in a groove shape, on the surface of the second split mold 3 adjacent to the third split mold. FIG. 3A illustrates an example of this configuration that corresponds to the second example. In FIG. 3A, the sprue-side runners 13, each leading from the sprue 11 to the corresponding gate-side runner 14 via the sprue reservoir 12, are radially provided, in a groove shape, on the surface of the second split mold 3 adjacent to the third split mold.

Figures 3B, 3C:
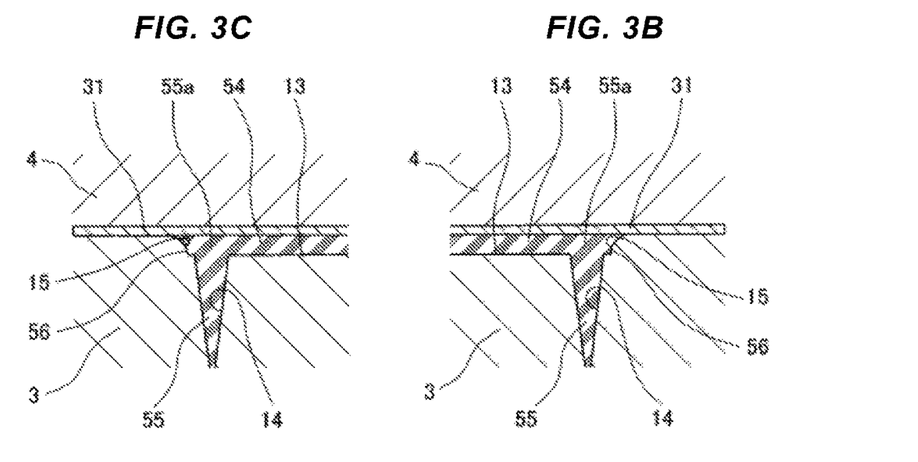
FIGS. 3B and 3C are each enlarged views of the main constituents of FIG. 3A.

In such a configuration, as enlarged and illustrated in FIGS. 3B and 3C, the sprue-side runner 13 is in direct communication with the root portion of the gate-side runner 14, and the burr 54 formed in the sprue-side runner 13 is formed to directly connect to the root portion (the adhering portion 55a) of the burr 55 formed in the gate-side runner 14. As such, the radiused shape 56 with an arcuate cross section is given to part of the entire periphery of the adhering portion 55a, to the sheet member 31, of the runner burr 55, except for the other part of the periphery to which the burr 54 formed in the sprue-side runner 13 connects.

Third Example

Figure 4A:
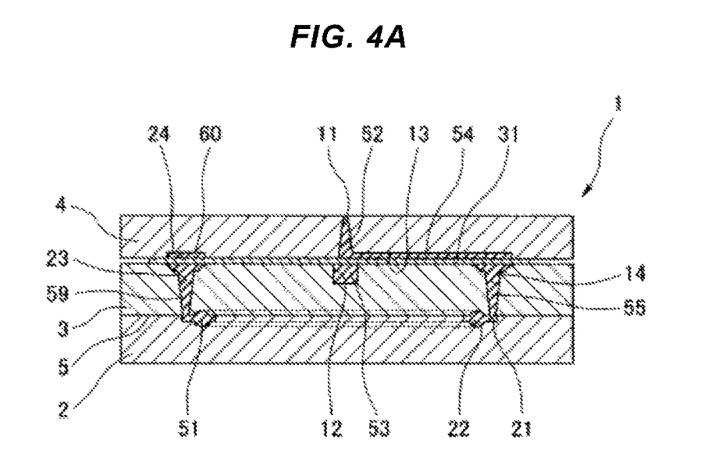
FIG. 4A is a cross-sectional view of a molding die according to a third example of the present invention.

FIG. 4A illustrates the molding die 1 according to the third example of the present invention. The molding die 1 is configured to mold (injection mold) a sealing article 51, such as a gasket, formed from a rubber-like elastic material as the molded article thereof. The molding die 1 is provided with a first split mold 2, a second split mold 3 combined with the first split mold 2 in an openable and closeable manner, and a third split mold 4 combined with the second split mold 3 in an openable and closeable manner. The first split mold (bottom mold) 2, the second split mold (middle mold) 3, and the third split mold (top mold) 4 are arranged in order from bottom to top in FIG. 4A.

A gate 21 and cavity 22 are provided in a parting portion 5 between the first split mold 2 and the second split mold 3. The cavity 22 is formed in an endless shape in order to correspond to a sealing article such as a gasket, which typically has an endless shape. The gate 21 is provided at one location or a plurality of locations (one location in FIG. 4A) on the periphery of the cavity 22.

A sprue 11 is provided, in the third split mold 4, penetrating through the third split mold 4 in a plate thickness direction. Sprue-side runners 13 leading from an end portion of the sprue 11 are radially provided, in a groove shape, on the surface of the third split mold 4 adjacent to the second split mold. A gate-side runner 14 leading from an end portion of the sprue-side runner 13 to the gate 21 is provided, in a hole shape, penetrating through the second split mold 3 in the plate thickness direction and, in the same manner, an air vent hole 23 leading from the cavity 22 is provided, in a hole shape, penetrating through the second split mold 3 in the plate thickness direction. Additionally, a sprue reservoir 12 is provided on the surface of the second split mold 3 adjacent to the third split mold, at a position on the plane corresponding to the sprue 11, and a vent reservoir 24 is provided on the surface of the third split mold 4 adjacent to the second split mold, at a position on the plane corresponding to the air vent hole 23.

A structure is given in which a pliable sheet member such as paper or nonwoven fabric (hereinafter also referred to as "paper") 31 is sandwiched between the second split mold 3 and the third split mold 4. The sandwiched sheet member 31 is clamped by both surfaces of the second split mold 3 adjacent to the third split mold and of the third split mold 4 adjacent to the second split mold and faces the sprue 11, the sprue reservoir 12, the sprue-side runner 13, the gate-side runner 14, the air vent hole 23, and the vent reservoir 24. Therefore, the rubber-like molding material charged into each of these portions is brought into contact with the sheet member 31 and is partially impregnated into the sheet member 31. Then, after curing, this rubber-like molding material adheres to the sheet member 31 as burrs (a sprue burr 52 formed in the sprue 11, a sprue burr 53 formed in the sprue reservoir 12, a runner burr 54 formed in the sprue-side runner 13, a runner burr 55 formed in the gate-side runner 14, a vent burr 59 formed in the air vent hole 23, and a vent burr 60 formed in the vent reservoir 24).

Note that the rubber-like molding material, when being injected, penetrates through the sheet member 31 in the thickness direction or breaks through a portion of the sheet member 31, thereby flowing from the sprue 11 to the sprue reservoir 12, from the sprue-side runner 13 to the gate-side runner 14, and from the air vent hole 23 to the vent reservoir 24.

Figure 4B:
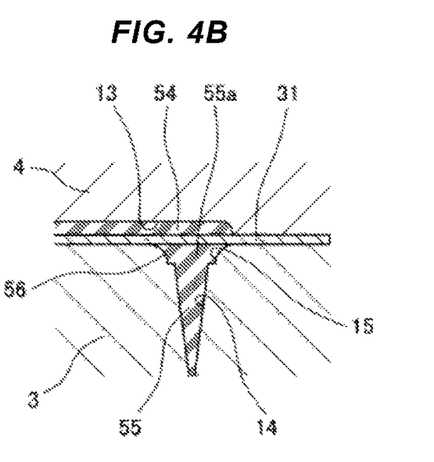
FIGS. 4B and 4C are each enlarged views of the main constituents of FIG. 4A.

The hole-shaped gate-side runner 14 is formed in a funnel shape so that an opening cross-sectional area thereof gradually shrinks from the side adjacent to the sheet member 31 to the side adjacent to the gate 21. However, an end portion of the gate-side runner 14 adjacent to the sheet member 31 is formed as a disk-shaped space with a comparatively large diameter in order to secure a wide adhering area of a portion (a root portion) of the runner burr 55 that is formed at the end portion of the gate-side runner 14 adjacent to the sheet member 31 and is defined as an adhering portion 55a to the sheet member 31. However, if the inner peripheral surfaces of these disk-shaped spaces are left perpendicular to the plane of the sheet member 31, stress will easily concentrate in the burr removal step as described above, and the burrs 55 will easily detach from the sheet member 31. As such, in this example, as enlarged and illustrated in FIG. 4B, a configuration is given in which a radiused shape 56 with an arcuate cross section is given to the periphery of the adhering portion 55a, to the sheet member 31, of the runner burr 55. As such, in order to give the radiused shape 56 with an arcuate cross section to the runner burr 55 formed in the gate-side runner 14, a radiused shape shaping portion 15 is provided on an opening periphery portion of the gate-side runner 14 adjacent to the sheet member 31. The radiused shape 56 is a concave radiused shape, the radiused shape shaping portion 15 is a convex radiused shape, and these are provided over the entire periphery.

Figure 4C:
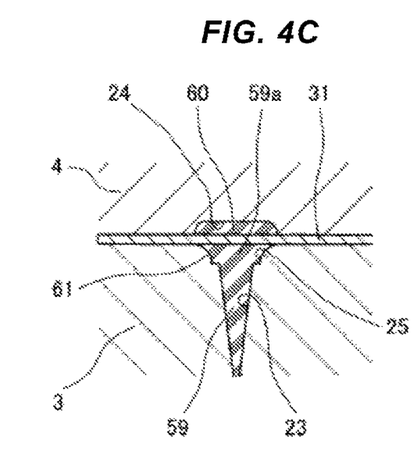

The hole-shaped air vent hole 23 is formed in a funnel shape so that an opening cross-sectional area thereof gradually enlarges from the side adjacent to the cavity 22 to the side adjacent to the sheet member 31. However, an end portion of the air vent hole 23 adjacent to the sheet member 31 is formed as a disk-shaped space with a comparatively large diameter in order to secure a wide adhering area of a portion (a root portion) of the vent burr 59 that is formed at the end portion of the air vent hole 23 adjacent to the sheet member 31 and is defined as an adhering portion 59a to the sheet member 31. However, if the inner peripheral surface of this disk-shaped space is left perpendicular to the plane of the sheet member 31, stress will easily concentrate in the burr removal step as described above, and the burr 59 will easily detach from the sheet member 31. As such, in this example, as enlarged and illustrated in FIG. 4C, a configuration is given in which a radiused shape 61 with an arcuate cross section is given to the periphery of the adhering portion 59a, to the sheet member 31, of the vent burr 59. As such, in order to give the radiused shape 61 with an arcuate cross section to the vent burr 59 formed in the air vent hole 23, a radiused shape shaping portion 25 is provided on an opening periphery portion of the air vent hole 23 adjacent to the sheet member 31. The radiused shape 61 is a concave radiused shape, the radiused shape shaping portion 25 is a convex radiused shape, and these are provided over the entire periphery.

Molding with the molding die 1 described above, as a molding method, includes molding a molded article 51 with the molding die 1 that includes the sprue 11, the sprue reservoir 12, the sprue-side runner 13, the gate-side runner 14, the gate 21, the cavity 22, the air vent hole 23, and the vent reservoir 24; opening the molding die 1; and thereafter, performing a burr removal step of removing the burrs 52, 53, 54, 55, 59, and 60 including the runner burr 55 formed in the gate-side runner 14 and the vent burr 59 formed in the air vent hole 23, from the molding die 1. In the burr removal step, with the burrs 52, 53, 54, 55, 59, and 60 adhering to the sheet member 31 placed beforehand in the molding die 1, peeling the sheet member 31 from the split mold 3 of the molding die 1 causes the burrs 52, 53, 54, 55, 59, and 60 to be removed together with the sheet member 31. Additionally, the radiused shapes 53 and 61 with arcuate cross sections are given by the molding die 1 to the peripheries of the adhering portions 55a and 59a, to the sheet member 31, of the runner burr 55 and the vent burr 59 so as to make the runner burr 55 and the vent burr 59 less prone to detach from the sheet member 31 in the peeling as described above.

Thus, according to this example, so-called paper releasing is performed. As such, the time required for the burr removal step can be shortened. Moreover, the radiused shapes 56 and 61 with arcuate cross sections are provided on the peripheries of the adhering portions 52a and 59a, to the sheet member 31, of the runner burr 52 and the vent burr 59 and, which makes stress less prone to concentrate due to these radiused shapes 56 and 61, and the runner burr 55 and makes the vent burr 59 less prone to detach from the sheet member 31.

Fourth Example

Figure 5A:
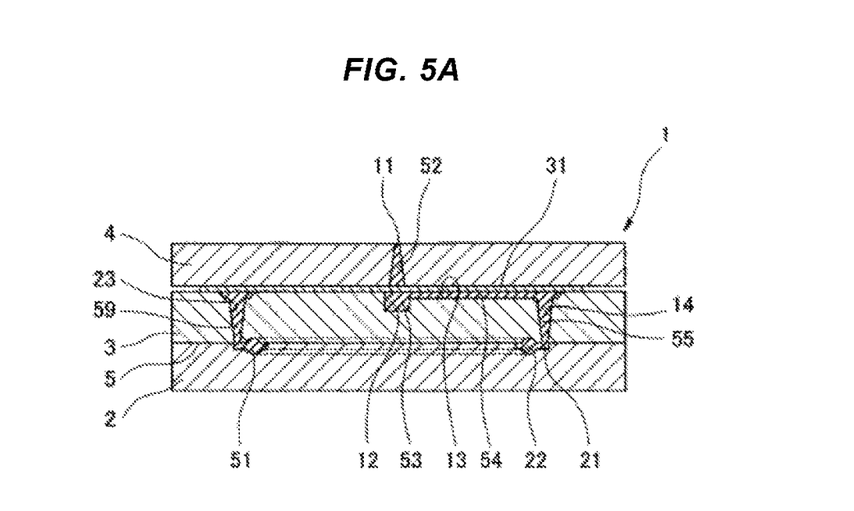
FIG. 5A is a cross-sectional view of a molding die according to a fourth example of the present invention.

In the third example described above, the sprue-side runners 13, each leading from the end portion of the sprue 11, are radially provided, in a groove shape, on the surface of the third split mold 4 adjacent to the second split mold. Alternatively, the sprue-side runners 13, each leading from the end portion of the sprue 11, may be provided, in a groove shape, on the surface of the second split mold 3 adjacent to the third split mold. FIG. 5A illustrates an example of this configuration that corresponds to the fourth example. In FIG. 5A, the sprue-side runners 13, each leading from the sprue 11 to the corresponding gate-side runner 14 via the sprue reservoir 12, are radially provided, in a groove shape, on the surface of the second split mold 3 adjacent to the third split mold.

Figure 5B:
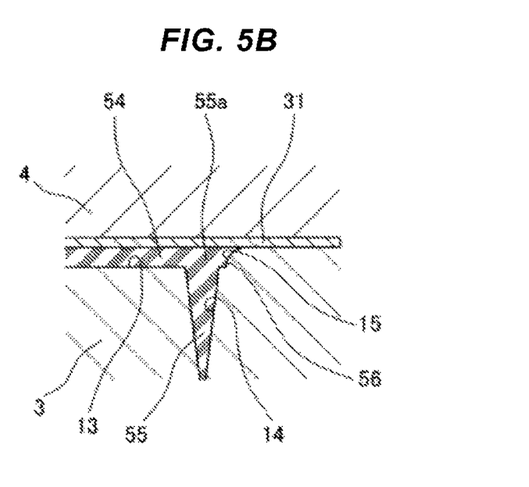
FIGS. 5B and 5C are each enlarged views of the main constituents of FIG. 5A.
Figure 5C:
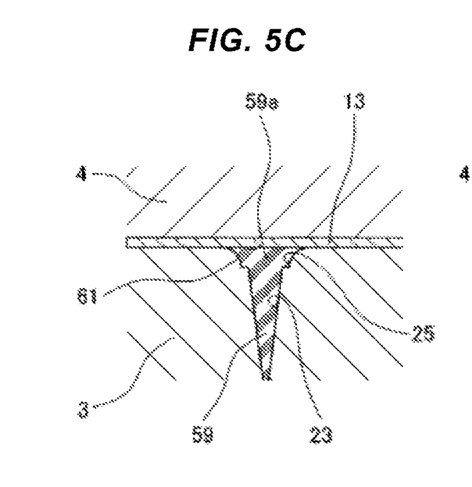

In this configuration, as enlarged and illustrated in FIG. 5B, the sprue-side runner 13 is in direct communication with the root portion of the gate-side runner 14, and the burr 54 formed in the sprue-side runner 13 is formed to directly connect to the root portion (the adhering portion 55a) of the burr 55 formed in the gate-side runner 14. As such, the radiused shape 56 with an arcuate cross section is given to part of the entire periphery of the adhering portion 55a, to the sheet member 31, of the runner burr 55, except for the other part of the periphery to which the burr 54 formed in the sprue-side runner 13 connects.

Additionally, in a comparison with the third working example, the fourth example including the configuration described above has the following merits.

Specifically, in the third example, as described above, the rubber-like molding material, when being injected, passes through the sheet member 31 at each of a first location from the sprue 11 to the sprue reservoir 12, a second location from the sprue-side runner 13 to the gate-side runner 14, and a third location from the air vent hole 23 to the vent reservoir 24. In contrast, in the fourth example, the rubber-like molding material passes through the sheet member 31 at only a first location from the sprue 11 to the sprue reservoir 12 and a second location from the air vent hole 23 to the vent reservoir 24 (in a case where the vent reservoir 24 is omitted as illustrated in FIG. 5B, at only the first location from the sprue 11 to the sprue reservoir 12). Accordingly, the fourth example makes it possible to reduce the risk of the fiber of the sheet member 31 being mixed in the molded article 51 as a contaminant compared to a fifth example.

The type of molded article obtained according to the present invention is not particularly limited and, for example, may be a gasket for a fuel cell or the like. The molded article may, for example, be CELLSEAL for fuel cells or the like, obtained by integrally molding a rubber seal with a base material.

What is claimed is:
1. A molding die comprising:
   a first split mold;
   a second split mold configured to be combined with the first split mold in an openable and closeable manner; and
   a third split mold configured to be combined with the second split mold in an openable and closeable manner;
   wherein a gate configured for receipt of a molding material and transfer of the molding material to a cavity is provided in a parting portion between the first split mold and the second split mold, the cavity being configured and shaped for forming a molded part formed from the molding material;
   a sprue is provided in the third split mold, the sprue being configured for communicating the molding material into the gate and the cavity;
   a sprue-side runner leading from the sprue is provided on a surface of the third split mold adjacent to the second split mold or on a surface of the second split mold adjacent to the third split mold, the sprue-side runner being configured for receipt of the molding material from the sprue and communicating the molding material to the gate and the cavity;

a gate-side runner leading from the sprue-side runner to the gate is provided on the second split mold, the gate-side runner being configured for receipt of the molding material from the sprue-side runner and transferring the molding material to the gate and the cavity;

a pliable sheet member such as paper or nonwoven fabric is provided between the second split mold and the third split mold for adherence to a first removable burr formed in the sprue side runner and a second removable burr formed in the gate-side runner upon injection of the molding material into the sprue side runner and the gate-side runner; and a radiused shape shaping portion that is a convexity having an arcuate cross section is provided on an opening periphery portion of the gate-side runner adjacent to the sheet member for imparting a radiused shape in the second removable burr formed in the gate side runner, the convexity radially narrowing the gate-side runner at the opening periphery portion.

2. The molding die according to claim 1, wherein
the second split mold includes an air vent hole leading from the cavity;
and
a radiused shape shaping portion for imparting another radiused shape with an arcuate cross section to a third removable burr formed in the air vent hole upon receipt of the molding material is provided on an opening periphery portion of the air vent hole adjacent to the sheet member.

3. The molding die according to claim 1, wherein
a thin film molding portion configured to mold a thin film-like adhered portion integral with the second removable burr is provided on an outer side of the radiused shape shaping portion of the gate-side runner.

4. The molding die according to claim 2, wherein
another thin film molding portion configured to mold a thin film-like adhered portion integral with the third removable burr is provided on an outer side of the radiused shape shaping portion of the air vent hole.

* * * * *